3,118,003
PRODUCTION OF PENTAERYTHRITOL
DICHLORHYDRIN
Matthias Seefelder, Ludwigshafen (Rhine), Gartenstadt, and Gerald Neubauer, Ludwigshafen (Rhine), Germany, assignors to Badische Anilin- & Soda-Fabrik Aktiengesellschaft, Ludwigshafen (Rhine), Germany
No Drawing. Filed June 14, 1960, Ser. No. 35,868
Claims priority, application Germany June 18, 1959
4 Claims. (Cl. 260—633)

This invention relates to a process for the production of pentaerythritol dichlorhydrin. More particularly it relates to a process for the production of pentaerythritol dichlorhydrin from pentaerythritol and hydrogen chloride in the presence of a solvent which enables the process to be carried out under low pressure, such as atmospheric pressure.

It is known that pentaerythritol dichlorhydrin is obtained by reacting pentaerythritol, as a rule in the presence of a proton acceptor, with thionyl chloride and saponifying the sulfurous acid ester thus obtainable to pentaerythritol dichlorhydrin (U.S. Patent Nos. 2,708,198 and 2,844,592). This process has the disadvantage that for each mol of pentaerythritol dichlorhydrin there are required 3 mols of thionyl chloride, i.e. 6 chlorine atoms. One mol of the relatively expensive thionyl chloride is required merely for temporarily blocking two hydroxyl groups and is removed in a second stage by hydrolysis. Another mol of thionyl chloride is converted into sulfurous dioxide and halogen chloride.

According to the process of U.S. Patent No. 2,441,515, pentaerythritol is reacted with acetone to form pentaerythritol monoacetone acetal and this is treated with paratoluenesulfochloride in pyridine, whereby the two free hydroxyl groups are replaced by chlorine. By splitting off the acetone there is then obtained pentaerythritol dichlorhydrin, but only in modest yields. Besides the unsatisfactory yields, it is a disadvantage of this process that a relatively difficultly accessible chlorinating agent and an expensive solvent (pyridine) are required. Furthermore, the said process has to be carried out in three stages.

Hydrogen chloride has also been used as the chlorination agent. Thus according to U.S. Patent No. 2,763,679 a hot solution of pentaerythritol in glacial acetic acid is allowed to react with hydrogen chloride. In this case also, pentaerythritol dichlorhydrin is not obtained directly; first its diacetate is obtained and this must then be saponified. The same disadvantage occurs with the process of U.S. Patent No. 2,816,912 according to which esters of pentaerythritol are reacted with hydrogen chloride. Again, the first products formed are esters of pentaerythritol dichlorhydrin, which compounds must then be split by the interchange of ester radicals with methanol.

Finally pentaerythritol dichlorohydrin has already been prepared directly from hydrogen chloride and pentaerythritol by heating the latter in the presence of a solvent which is inert to pentaerythritol dichlorhydrin with the calculated amount or an excess of hydrogen chloride under pressure and at temperatures between 120° and 160° C. (German patent specification No. 955,234). This process has the disadvantage that moist hydrogen chloride (water is namely formed during the reaction) must be reacted at elevated temperatures and under pressure. It is true that vessel materials are known which will withstand moist hydrogen chloride at elevated temperatures, but these are only suitable for apparatus which is to be used under atmospheric or slightly elevated pressure since their mechanical stability is poor. Such materials consist essentially of graphite. It is also true that tantalum, under the conditions of the process, is stable to some degree chemically and wholly mechanically, but it has little to recommend it by reason of its high cost and the difficulty experienced in working it. For these reasons it is difficult to carry out the last mentioned process on an industrial scale.

It is an object of this invention to provide a process for the production of pentaerythritol dichlorhydrin in good yields. It is another object of the invention to provide a process for the production of pentaerythritol dichlorhydrin which does not require an expensive solvent. Yet another object of the invention is to provide a process according to which pentaerythritol dichlorhydrin can be obtained in a one-stage process. It is a further object of the invention to provide a one-stage process for the production of pentaerythritol dichlorhydrin in which hydrogen chloride is used as the chlorinating agent and which can be readily worked on an industrial scale.

In accordance with the invention these objects and advantages are achieved by reacting pentaerythritol at a temperature between about 100° C. and 170° C., with hydrogen chloride while using a reaction product of pentaerythritol with hydrogen chloride as solvent for the pentaerythritol.

The reaction is represented by the following scheme:

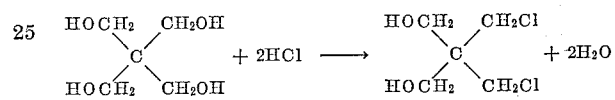

According to the new process successful results are achieved not only with pure pentaerythritol but also with the commercial-grade reaction mixtures obtained by the reaction of acetaldehyde with formaldehyde, these latter containing up to 15% by weight (as a rule 10 to 15% by weight) of dipentaerythritol.

Reaction products of pentaerythritol with hydrogen chloride which are suitable as solvents are for example, pentaerythritol monochlorhydrin, pentaerythritol trichlorhydrin and especially pentaerythritol dichlorhydrin. None of these compounds needs to be used in pure form. Admixtures of the said compounds are also useful, as are the reaction products obtained by the action of hydrogen chloride on pure or commercial-grade pentaerythritol, said products consisting mainly of pentaerythritol dichlorhydrin. 5,5-Di-chlormethyl-dioxane-1,3, which is obtained as a byproduct when reacting commercial-grade pentaerythritol with hydrogen chloride, is also a suitable solvent. The solvents are preferably used in an amount of 100 to 1,000% by weight with reference to the pentaerythritol.

By the coemployment of the said solvents for pentaerythritol it is possible to carry out the reaction at normal pressure and without catalysts, such as zinc chloride. It is thus possible to use cheaper, completely stable vessel materials. At the same time, there are avoided those complications which occur in the working up of the reaction mixture when a catalyst has been coemployed. The success of the reaction according to the present process is surprising in view of the fact that in "Die Praxis des organischen Chemikers" (The practice of the organic chemist), 32nd edition (1947), pages 91 and 92, Gatterman states that the reaction of primary alcohols with hydrogen chloride will only take place under pressure or in the presence of a dehydrating agent. It is believed that the favorable effect of the solvents according to the invention is at least partly due to the fact that the starting compound, pentaerythritol, is dissolved, thus forming only one liquid phase.

Although processing under atmospheric pressure is the most convenient method it should be noted that working under moderately elevated pressure is also possible. The upper limit for the pressure is determined by the mechanical stability of the chemically resistant materials used for the reaction vessels (preferably graphite-containing materials). Pressures of up to about 5 atmospheres are applicable.

The hydrogen chloride is used in at least the amount theoretically necessary, but advantageously in an excess, the actual amount depending on the embodiment of the process chosen. As it flows through the reaction mixture the hydrogen chloride entrains with it the water of reaction and a part of the reaction product. If the stream of hydrogen chloride, after separation of the liquid constituents entrained therewith, is returned to the process, the theoretical amount of hydrogen chloride is in the main sufficient. Circulating the hydrogen chloride in this way is also recommendable because the vapor pressure of pentaerythritol dichlohydrin is quite considerable even at room temperature and great difficulty is experienced in achieving a complete removal of the pentaerythritol dichlorhydrin from the gas stream.

The reaction period depends mainly on the reaction temperature, the speed with which the hydrogen chloride is supplied and the extent to which the two phases of the reaction mixture are mixed together. The reaction period is, for example, shorter if the mixing is thorough. If the reaction is carried out at the lower limit of the recited temperature range, i.e. at about 100° C., approximately 100 hours are required for the reaction. If, however, the temperature is raised to about 170° C., the reaction period can be reduced to about 8 hours. The amount of hydrogen chloride dissolved in the liquid phase also has a considerable influence on the reaction period. In order to complete the reaction in as short a time as possible, the reaction should be carried out in a vessel which is filled to a high level with the liquid reaction mixture.

The process according to this invention may be carried out discontinuously or continuously. One discontinuous method consists, for example, in heating the pentaerythritol and the solvent to the reaction temperature and then leading in the desired amount of hydrochloride, advantageously in fine dispersion. It is also possible to begin the supply of hydrogen chloride while the pentaerythritol and the solvent are still being heated up. The most favorable reaction temperatures lie between 120° and 170° C. At lower temperatures the reaction speed is greatly diminished and at higher temperatures there is a risk that the pentaerythritol will decompose and that the yield of pentaerythritol dichlorhydrin will diminish by reason of undesirable side reactions. The reaction mixture is advantageously worked up by distillation. The pentaerythritol dichlorhydrin fraction may if desired be further purified by another distillation or by crystallization, for example, from water.

A continuous reaction may be carried out for example by passing the hydrogen chloride and the mixture of solvent and pentaerythritol in countercurrent through a vertical tube which may be provided with insertions which prevent the reaction product from mixing with the initial product. The reaction product may be withdrawn continuously or in batches from the lower part of the tube. In such an embodiment of the process it is especially recommendable to return the excess hydrogen chloride to the process after separation of the liquid substances entrained therewith. The working up of the reaction product may be carried out in the manner described above.

Pentaerythritol dichlorhydrin is a valuable intermediate for the production of flameproof polyester resins.

The following examples will further illustrate this invention but the invention is not restricted to these examples. The parts specified are parts by weight.

*Example 1*

200 parts of commercial-grade pentaerythritol (content of dipentaerythritol 15%) are dissolved in 300 parts of pentaerythritol dichlorhydrin while stirring at 160° to 170° C. At the same temperature, 1500 parts of hydrogen chloride are led through the mixture in a moderate stream during the course of 8 hours. By distilling the reaction mixture and the condensate which occurs when the unreacted hydrogen chloride stream is cooled there are obtained 480 parts of pentaerythritol dichlorhydrin. This corresponds to a yield of 83% of the theory with reference to pure pentaerythritol.

If, by way of comparison, the reaction is carried out in an inert solvent, as prescribed in German patent specification 955,234, for example in cumene or dichlorbenzene, but under otherwise identical conditions, no pentaerythritol dichlorhydrin is obtained.

*Example 2*

A solution of 4 kg. of pentaerythritol in 17 kg. of pentaerythritol dichlorhydrin is heated externally at 130° to 140° C. in a vertical glass reaction vessel which is provided with a tubular insertion for circulating the reaction mixture. The liquid phase stands 300 cm. high in the reaction vessel. Approximately 920 liters of hydrogen chloride at a pressure of 760 mm. Hg and a temperature of 20° C. are hourly introduced into the reaction vessel from below; the hydrogen chloride is partly required for the reaction, but at the same time it causes the liquid to circulate in the reaction tube. The excess of hydrogen chloride can be withdrawn from the upper end of the reaction tube over a condenser. The reaction water formed is thus distilled off and collected in a separator with that part of the reaction product which is entrained with the gas stream. The unreacted hydrogen chloride is led through two wash bottles charged with concentrated hydrochloric acid into a gasometer which is constantly kept at the same level by the introduction of fresh hydrogen chloride. A gas pump situated between the gasometer and the reaction vessel pumps 1500 g. of hydrogen chloride per hour in circulation. After 20 hours 4 kg. of product are withdrawn from the bottom of the reaction vessel and 4 kg. of fresh pentaerythritol introduced at the top. The experiment is carried out for an indefinite period in this way, 4 kg. of pentaerythritol being reacted every 20 hours. The reaction product withdrawn from the reactor is united with the product from the separator and distilled in vacuo. There are obtained from every 4 kg. of pentaerythritol (content of monopentaerythritol 80 to 85%) 3.4 kg. of pentaerythritol dichlorhydrin which gives the following analysis:

|  | Calculated | Found |
| --- | --- | --- |
| Cl _____ percent __ | 40.9 | 41.0 |
| Hydroxyl number _____ | 612 | 647 |

If the reaction vessel used is divided into a lower chamber which is filled to a height of 100 cm. with liquid and an upper chamber which is twice as large and is filled to a height of 200 cm. with liquid the reaction period can be reduced to 12 hours. The two reaction chambers are linked together by two glass tubes provided with valves. Hydrogen chloride flows from the lower to the upper chamber through one of these, while the other is used for replenishing the lower reaction chamber.

The experiment is carried out in the following manner: every 12 hours 4 kg. of product are withdrawn from the lower reaction chamber, 4 kg. of product are allowed to flow from the upper to the lower chamber and 4 kg. of pentaerythritol are introduced into the upper chamber. The remaining conditions are the same as those recited above.

We claim:

1. A process for the production of pentaerythritol dichlorohydrin which comprises reacting pentaerythritol and hydrogen chloride gas at an elevated temperature of between about 100° C. and 170° C. under a pressure of about 1 to 5 atmospheres, the pentaerythritol being dissolved in a solvent consisting essentially of a member selected from the group consisting of pentaerythritol monochlorohydrin, pentaerythritol dichlorohydrin, pentaerythritol trichlorohydrin and mixtures thereof, said solvent being used in an amount of about 100 to 1000% by weight with reference to the pentaerythritol.

2. A process as claimed in claim 1 wherein the solvent for pentaerythritol is pentaerythritol dichlorhydrin.

3. A process as claimed in claim 1 wherein hydrogen chloride is led as a stream through a solution of pentaerythritol in said solvent compound and the effluent hydrogen chloride, after condensation of the entrained substances which are liquid under normal conditions, is returned to the process.

4. A process as claimed in claim 1 wherein a crude pentaerythritol containing up to 15% by weight of dipentaerythritol is reacted with said hydrogen chloride.

References Cited in the file of this patent
UNITED STATES PATENTS 2,763,679     Dee _____ Sept. 18, 1956

UNITED STATES PATENT OFFICE
CERTIFICATE OF CORRECTION

Patent No. 3,118,003 January 14, 1964

Matthias Seefelder et al.

It is hereby certified that error appears in the above numbered patent requiring correction and that the said Letters Patent should read as corrected below.

Column 1, line 31, for "2,441,515" read -- 2,441,595 --.

Signed and sealed this 21st day of July 1964.

SEAL)

Attest:

ESTON G. JOHNSON
Attesting Officer

EDWARD J. BRENNER
Commissioner of Patents